United States Patent
Nielsen et al.

(10) Patent No.: US 7,624,671 B2
(45) Date of Patent: Dec. 1, 2009

(54) HYDRAULIC ACTUATOR FOR A SERVOMOTOR WITH AN END LOCK FUNCTION

(75) Inventors: Brian Nielsen, Viborg (DK); Ole Ploug, Roedekro (DK); Chad M. Patterson, Huxley, IA (US)

(73) Assignee: Sauer-Danfoss Aps, Nordborg (DK)

( * ) Notice: Subject to any disclaimer, the term of this patent is extended or adjusted under 35 U.S.C. 154(b) by 144 days.

(21) Appl. No.: 11/703,314

(22) Filed: Feb. 7, 2007

(65) Prior Publication Data
US 2008/0184874 A1  Aug. 7, 2008

(51) Int. Cl.
*F15B 11/00* (2006.01)
*F16H 61/42* (2006.01)
(52) U.S. Cl. .............................. 91/31; 91/459; 60/422
(58) Field of Classification Search .................. 91/31, 91/361, 388, 454, 457
See application file for complete search history.

(56) References Cited

U.S. PATENT DOCUMENTS

| | | | |
|---|---|---|---|
| 2,569,881 A | | 10/1951 | Davies |
| 3,559,536 A | | 2/1971 | Mason |
| 4,416,187 A | * | 11/1983 | Nystrom .................. 91/454 |
| 4,870,892 A | | 10/1989 | Thomsen et al. ............ 91/361 |
| 5,165,320 A | * | 11/1992 | Ravn ....................... 91/454 |
| 5,202,822 A | | 4/1993 | McLaughlin et al. |
| 5,299,420 A | | 4/1994 | Devier et al. |
| 5,353,685 A | | 10/1994 | Snow |
| 5,489,005 A | | 2/1996 | Marcott et al. |
| 5,519,636 A | | 5/1996 | Stoll et al. |

(Continued)

FOREIGN PATENT DOCUMENTS

DE   92 11 109.2 U1   10/1992

(Continued)

OTHER PUBLICATIONS

Co-pending U.S. Appl. No. 11/703,575 entitled "A Control System For A Hydraulic Servomotor" filed Feb. 7, 2007.

(Continued)

*Primary Examiner*—Thomas E Lazo
(74) *Attorney, Agent, or Firm*—McCormick, Paulding & Huber LLP

(57) ABSTRACT

A hydraulic actuator for a hydraulic servomotor (4) is disclosed. The hydraulic servomotor (4) is of a kind having at least one defined end position, and has a first chamber (5) and a second chamber (6) associated therewith. The actuator is connected to a fluid source (2) and a fluid drain (3). The actuator comprises a first valve (7) fluidly connected between the fluid source (2) and the first chamber (5), a second valve (8) fluidly connected between the first chamber (5) and the fluid drain (3), and a third valve (9) fluidly connected between the fluid source (2) and the second chamber (6). The actuator further comprises a flow channel (10, 17), preferably comprising a flow restrictor (12, 18), in fluid communication with the second chamber (6).

The valves (7, 8, 9) are such that, in the case of a power cut off, they will prevent a fluid flow out of the first chamber (5), and a fluid flow out of the second chamber (6) takes place via the flow channel (10, 17). This will cause a servomotor piston member (13) to move towards the second chamber (6), thereby moving the hydraulic servomotor (4) to an end position.

16 Claims, 5 Drawing Sheets

U.S. PATENT DOCUMENTS

| | | | |
|---|---|---|---|
| 5,743,165 A * | 4/1998 | Tanaka et al. | 91/454 |
| 5,868,059 A * | 2/1999 | Smith | 91/454 |
| 5,960,695 A * | 10/1999 | Aardema et al. | 91/454 |
| 6,131,391 A * | 10/2000 | Poorman | 91/454 |
| 6,626,082 B2 * | 9/2003 | Morita et al. | 91/465 |
| 6,637,199 B2 | 10/2003 | Spickard | |
| 6,662,556 B2 | 12/2003 | Bares et al. | |
| 6,748,738 B2 | 6/2004 | Smith | |
| 7,380,398 B2 | 6/2008 | Pfaff | |
| 2004/0196003 A1 | 10/2004 | Graff et al. | |
| 2004/0196003 A1 | 10/2004 | Graff et al. | |
| 2006/0136101 A1 | 6/2006 | Spengler | |
| 2006/0136101 A1 | 6/2006 | Spengler | |

FOREIGN PATENT DOCUMENTS

| | | |
|---|---|---|
| DE | 4312757 A1 | 10/1994 |
| DE | 102005013823 A1 | 11/2005 |
| EP | 1 403 129 A2 | 3/2004 |
| EP | 1700728 A2 | 9/2006 |
| WO | 96/07029 A1 | 3/1996 |
| WO | 2005077731 A1 | 8/2005 |
| WO | 2005078318 A1 | 8/2005 |
| WO | 2006/102906 A2 | 10/2006 |

OTHER PUBLICATIONS

Co-pending U.S. Appl. No. 11/703,431 entitled "A Hydraulic Actuator Having An Auxiliary Valve" filed Feb. 7, 2007.

Co-pending U.S. Appl. No. 11/703,430 entitled "A Valve Assembly and A Hydraulic Actuator Comprising The Valve Assembly" filed Feb. 7, 2007.

International Search Report for Serial No. PCT/DK2008/000058 dated May 16, 2008.

International Search Report for Serial No. PCT/DK2008/000059 dated May 9, 2008.

International Search Report for Serial No. PCT/DK2008/000060 dated May 9, 2008.

International Search Report for Serial No. PCT/DK2008/000061 dated May 14, 2008.

* cited by examiner

HYDRAULIC ACTUATOR FOR A SERVOMOTOR WITH AN END LOCK FUNCTION

CROSS REFERENCE TO RELATED APPLICATIONS

This application discloses similar subject matter as disclosed in co-pending application Ser. No. 11/703,575 entitled "A Control System For A Hydraulic Servomotor"; co-pending application Ser. No. 11/703,431 entitled "A Hydraulic Actuator Having An Auxiliary Valve"; and co-pending application Ser. No. 11/703,430 entitled "A Valve Assembly and A Hydraulic Actuator Comprising The Valve Assembly" all assigned to the same Assignee and filed on the same date herewith.

FIELD OF THE INVENTION

The present invention relates to a hydraulic actuator for a hydraulic servomotor, the hydraulic actuator comprising a valve arrangement for controlling fluid flows to chambers defined by the hydraulic servomotor. The hydraulic actuator according to the invention ensures that the hydraulic servomotor is moved to an end position in a controlled manner in the case that power is lost or actuator failure is detected.

BACKGROUND OF THE INVENTION

Some prior art hydraulic actuators, such as the actuators disclosed in WO 96/07029 or U.S. Pat. No. 4,870,892 provide safety measures in case of electrical power cut off or actuator failure. In the actuators disclosed in WO 96/07029 and U.S. Pat. No. 4,870,892 this is obtained by causing a sliding member to move to a neutral position in the case of power cut off or actuator failure. In the actuator disclosed in U.S. Pat. No. 4,870,892 this is obtained by positioning the sliding member in the diagonal of a bridge circuit. Two valves which are normally closed in a de-energized state are fluidly connected between a pump and two pressure chambers of the sliding member, and two valves which are normally open in a de-energized state are fluidly connected between the pressure chambers and a tank. Furthermore, two biasing springs are arranged in the sliding member, biasing the sliding member towards the neutral position. Thus, in the case of an electrical power cut off the two valves arranged on the pump side are closed and the two valves on the tank side are opened. In the absence of fluid pressure from the pump, due to the closed valves on the pump side, the biasing springs will push the sliding member towards the neutral position, and fluid is allowed to flow between the tank and the pressure chambers, due to the open valves on the tank side. Accordingly, the sliding member is moved into the neutral position.

In the actuator disclosed in WO 96/07029 a sliding member is also positioned in the diagonal of a bridge circuit. However, in this case all four valves are of the normally open type. Thus, in the case of a power cut off, all four valves are opened. Thereby there is a permanent flow of fluid from the pressure source (pump) to the pressure sink (tank). Since this flow of fluid is distributed uniformly over the two branches of the bridge circuit, the pressure on each side of the sliding member is the same. Thereby the sliding member will be moved to a neutral position.

U.S. Pat. No. 4,416,187 discloses an actuator configuration based on switching valves where an instantaneous locking of a sliding member is possible. In the actuator disclosed in U.S. Pat. No. 4,416,187 a sliding member is positioned in the diagonal of a bridge circuit of valves. Two check valves are fluidly connected between a pump and two pressure chambers of the sliding member, the check valves being arranged in such a manner that a fluid flow is prevented in a direction from the pressure chambers towards the pump. Furthermore, two valves of the normally closed type are fluidly connected between the pressure chambers and a tank. Thus, in the case of a power cut off, the two valves of the normally closed type are closed. Thereby fluid is not allowed to flow out of the pressure chambers, and the sliding member is thereby locked in its instantaneous position.

However, in some hydraulic position motors, such as those incorporated in hydro-mechanical transmissions (HMT's) on all terrain vehicles or work utility vehicles, there is a need for hydraulically locking the sliding member in one of its end positions, if an actuator failure is detected or loss of power happens. For example, when a failure occurs in the actuation system or electrical power is lost in a HMT of a vehicle, an operator needs to drive the vehicle to a repair shop. In this particular situation it is desirable that the HMT shifts gently towards a specific gear ratio and is locked in this gear ratio. With regard to the hydraulic servomotor, this means that it should gently slide to a desired position, preferably an end position, and stay there.

SUMMARY OF THE INVENTION

It is, thus, an object of the invention to provide a hydraulic actuator for a hydraulic servomotor in which the hydraulic servomotor is moved to an end position and locked in this position in the case of a power cut off or a failure in the actuator is detected.

According to the invention the above and other objects are fulfilled by providing a hydraulic actuator for a hydraulic servomotor having a first chamber and a second chamber associated therewith, the actuator being connected to a fluid source and a fluid drain, the actuator comprising:
   a first valve fluidly connected between the fluid source and the first chamber, said first valve being of a kind which, in a de-energized state, allows a fluid flow between the fluid source and the first chamber, at least in a direction from the fluid source towards the first chamber,
   a second valve fluidly connected between the first chamber and the fluid drain, said second valve being of a kind which, in a de-energized state, prevents a fluid flow between the first chamber and the fluid drain,
   a third valve fluidly connected between the fluid source and the second chamber, said third valve being of a kind which, in a de-energized state, prevents a fluid flow between the second chamber and the fluid source, at least in a direction from the second chamber towards the fluid source, and
   a flow channel arranged in fluid communication with the second chamber, said flow channel being arranged in such a manner that a fluid flow is allowed in a direction out of the second chamber via the flow channel.

In the present context the term 'hydraulic actuator' should be interpreted to mean an actuator which is adapted to drive a hydraulic application, in this case a hydraulic servomotor.

The fluid source may advantageously be or comprise a pump, and the fluid drain may advantageously be or comprise a tank.

The first valve may be of a normally open kind, i.e. of a kind which allows a fluid flow in either direction when in a de-energized state. Alternatively, the first valve may be of a kind which, at least in a de-energized state, functions as a check valve, i.e. it allows a fluid flow in one direction, but prevents a fluid flow in the opposite direction. According to the present invention such a check valve should be arranged in such a manner that a fluid flow is allowed in a direction from the fluid source towards the first chamber and prevented in a direction from the first chamber towards the fluid source. Accordingly, fluid will be allowed to enter the first chamber via the first valve, but not to leave the first chamber via the first valve.

The third valve may be of a normally closed kind, i.e. of a kind which prevents a fluid flow in either direction when in a de-energized state. Alternatively, the third valve may be of a kind, which, at least in a de-energized state, functions as a check valve as defined above. According to the present invention such a check valve should be arranged in such a manner that a fluid flow is allowed in a direction from the fluid source towards the second chamber and prevented in a direction from the second chamber towards the fluid source. Accordingly, fluid will be allowed to enter the second chamber via the third valve, but not to leave the second chamber via the third valve.

In the case of a power cut off the first valve is opened, at least in a direction towards the first chamber, the second valve is closed, and the third valve is closed, at least in a direction towards the fluid source. Thereby fluid is prevented from flowing from the first chamber towards the fluid drain, but fluid is allowed to flow from the fluid source towards the first chamber. On the other hand, fluid is allowed to leave the second chamber via the flow channel, but not via the third valve. This has the consequence that fluid will enter the first chamber and fluid will leave the second chamber, and thereby the hydraulic servomotor is moved in a specified direction towards a specified position, preferably an end position. Once the hydraulic servomotor has reached the specified position, it will be locked in that position, at least for as long as the power cut off is ongoing, since a reversed fluid flow is not possible.

It should be noted that in the present context the term 'locked' should be interpreted to mean hydraulically locked or held, rather than mechanically locked.

It is an advantage that, in accordance with the invention, the hydraulic servomotor can be moved to a specified position and locked in the specified position because it can thereby be ensured that a failsafe position is automatically assumed in the case of a power cut off or actuator failure, and the failsafe position allows an operator to operate the application, e.g. to move the application, e.g. a vehicle, to a repair shop.

The hydraulic servomotor may be of a linear kind, e.g. comprising a sliding member with a piston slidingly arranged in a cylinder, the piston dividing the cylinder into the first and second chambers. As an alternative, the hydraulic servomotor may be of a rotational kind comprising one or more angularly movable members being displaceable in response to a supply of fluid to the first and second chambers. As another alternative, it may be of a kind comprising two linearly moving pistons, e.g. with a pressure chamber at one end of each piston and attached to a swash plate rotating about a trunnion.

The hydraulic servomotor is preferably of a kind having at least one defined rest position, such as at least one defined end position. In this case the servomotor is preferably moved to this rest position/end position in the case of a power cut off, in the manner described above.

The flow channel may preferably comprise or form a flow restrictor. According to this embodiment only a restricted fluid flow is allowed in a direction out of the second chamber via the flow channel. This has the consequence that when fluid leaves the second chamber via the flow channel as described above, this takes place relatively slowly, i.e. a controlled and gradual movement of the hydraulic servomotor towards the end position is obtained. This is very advantageous in applications where it is undesirable that the hydraulic servomotor is moved abruptly to the end position. Such an application could, e.g., be a vehicle propel system or a vehicle steering system. Furthermore, this arrangement would not inhibit operation of the hydraulic actuator under normal conditions.

The flow restrictor may be a separate member applied to or positioned in the flow channel. Alternatively, the flow restrictor may be integrally formed in the flow channel or be defined by certain properties of the flow channel. Thus, the flow channel may simply be a narrow tube or it may comprise a section being shaped in manner which restricts fluid flow, e.g. a narrow section.

The hydraulic actuator may further comprise a fourth valve fluidly connected between the second chamber and the fluid drain, said fourth valve being of a kind which, in a de-energized state, prevents a fluid flow between the second chamber and the fluid drain. According to this embodiment fluid will not be allowed to flow from the second chamber to the fluid drain via the fourth valve when the fourth valve is in a de-energized state. The fourth valve may advantageously be arranged in a flow path which is normally used during normal operation. Since this is prevented in the case of a power cut off, the fluid is forced to leave the second chamber via the flow channel. In this case the flow channel may be fluidly connected between the second chamber and the fluid drain, and in parallel with the fourth valve. In this case fluid will flow from the second chamber towards the fluid drain in the case of a power cut off.

As an alternative, the hydraulic actuator may further comprise a check valve fluidly connected between the fluid source and the second chamber, said check valve being arranged in parallel with the third valve in such a manner that a fluid flow is allowed in a direction from the second chamber towards the fluid source. The flow channel may be arranged in series with or integrated with the check valve. According to this embodiment fluid will flow from the second chamber towards the pressure source, via the check valve, in the case of a power cut off. A flow restrictor may advantageously be arranged in the flow channel, preferably in series with the check valve or forming an integral part of the check valve.

The hydraulic servomotor may comprise a moving member, said moving member having a first face area facing the first chamber and a second face area facing the second chamber.

In the case that the hydraulic servomotor is a linearly operating servomotor it may comprise a sliding member comprising a piston slidably arranged in a cylinder. In this case the piston may advantageously be or form part of the moving member.

In the case that the hydraulic servomotor is an angularly operating servomotor the moving member may be or comprise a rotatable member arranged in a housing.

The first face area may be different from the second face area. In this case the hydraulic servomotor may, e.g., be of a kind having two pistons of unequal diameter arranged integrated into the same sliding member and being linked mechanically. In this case it is particularly advantageous to be able to move the hydraulic servomotor to an end positioned in a controlled manner, since it must be expected that, in the absence of flow restriction of the fluid flow out of the second chamber during movement of the hydraulic servomotor the to end position, this movement would occur very fast due to the unequal face areas.

Alternatively or additionally, the moving member may be provided with biasing means biasing the moving member in a direction towards the first chamber or in a direction towards the second chamber. The biasing means may advantageously be or comprise a compressible spring. In the case that the biasing means biases the moving member in a direction towards the first chamber, the biasing means will inhibit movement of the hydraulic servomotor towards the end position, since it will tend to push the moving member in an opposite direction. Similarly, in the case that the biasing means biases the moving member in a direction towards the second chamber, the movement of the hydraulic servomotor towards the end position is enhanced.

At least one of the valves may be an electrically operable valve, e.g. a solenoid valve. In this case at least one of the valves may be driven by a pulse train signal.

The valves may be controlled by means of a closed loop control of the hydraulic servomotor. The closed loop control may, e.g., be based on position of the servomotor, e.g. linear position or angular position, pressure in the chambers and/or on any other suitable parameter.

Thus, the hydraulic actuator may further comprise at least one sensor, said sensor(s) being adapted to provide an input signal to the closed loop control. Suitable sensors may, e.g., be position sensors, such as linear variable displacement transducers (LVDT), pressure sensors, temperature sensors, flow sensors, etc.

The hydraulic actuator may further comprise at least one additional valve arranged in parallel with one or more of the first, second, third and fourth valve. This provides the possibility of adapting the flow capacity of the hydraulic actuator to a desired level.

The hydraulic actuator according to the present invention may suitably be used in a hydro-mechanical transmission (HMT), e.g. for an all terrain vehicle or a work utility vehicle, or in an electro hydraulic steering application, or any other suitable application.

The hydraulic actuator may comprise a main control module adapted to supply control signals to at least some of the valves, thereby controlling fluid flows in the actuator. The main control module may comprise one or more connectors, e.g. comprising connector pins, for receiving and/or transmitting signals, such as control signals, sensor signals, electric signals, optic signals, magnetic signals, etc. The actuator may further comprise or be connected to at least one extension control module comprising one or more connectors for receiving and/or transmitting signals. In this case the main control module and the extension control module(s) are preferably adapted to communicate signals to/from each other. Thereby it is possible to provide additional connectors for communicating signals to/from the actuator. Thereby it is possible to provide additional connectors for communicating with the main control module, and it may thereby be possible to allow for additional functionalities of the control module. Accordingly, a more 'intelligent' control system for the actuator can be provided, and the need for an external controller may even be avoided.

BRIEF DESCRIPTION OF THE DRAWINGS

The invention will now be described in further detail with reference to the accompanying drawings in which.

DETAILED DESCRIPTION OF THE INVENTION

Figure 1:
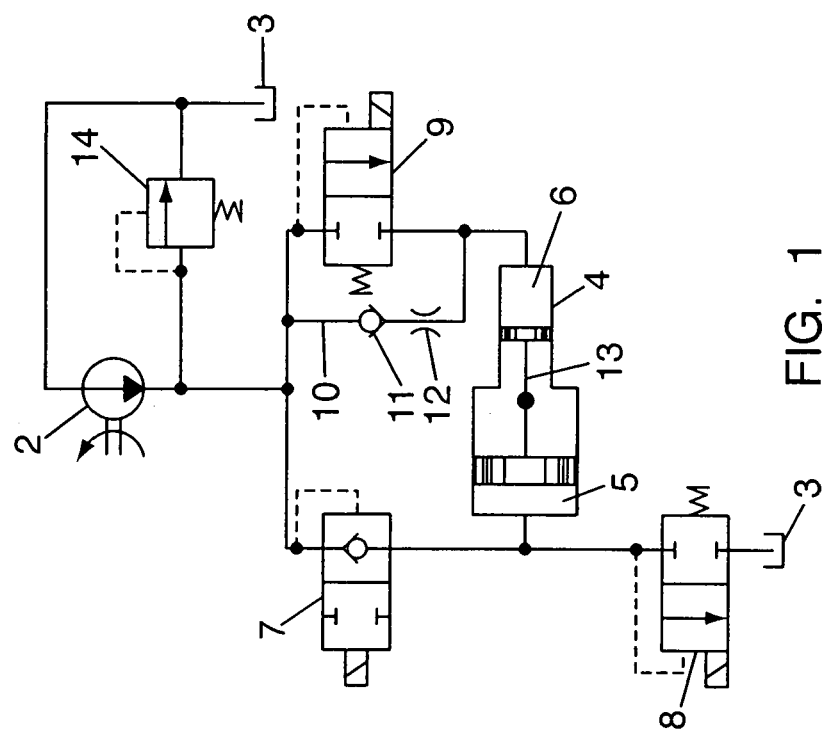

FIG. 1 is a schematic diagram of a hydraulic actuator according to a first embodiment of the invention. The hydraulic actuator comprises a valve assembly connected between a fluid source in the form of a pump 2 and a fluid drain in the form of a tank 3, and it is further connected to a servomotor 4, the servomotor 4 defining a first chamber 5 and a second chamber 6. A first valve 7 is fluidly connected between the pump 2 and the first chamber 5. The first valve 7 is a solenoid valve which is closed in an energized state. In a de-energized state the first valve 7 functions as a check valve arranged in such a manner that a flow of fluid in a direction from the pump 2 towards the first chamber 5 is allowed, while a flow of fluid in a direction from the first chamber 5 towards the pump 2 is not allowed.

A second valve 8 is fluidly connected between the first chamber 5 and the tank 3. The second valve 8 is a solenoid valve which is closed in a de-energized state and open in an energized state.

A third valve 9 is fluidly connected between the pump 2 and the second chamber 6. The third valve 9 is a solenoid valve which is closed in a de-energized state and open in an energized state. Arranged in parallel with the third valve 9 there is a flow channel 10 with a check valve 11 and a flow restrictor 12 arranged therein. The check valve 12 is arranged in such a manner that a flow of fluid is allowed in a direction from the second chamber 6 towards the pump 2, via the flow channel 10.

In the case of a power cut off the valves 7, 8, 9 will all be in their de-energized states. Accordingly, a flow of fluid will be allowed from the pump 2 towards the first chamber 5, but not in the reverse direction. Fluid flow from the first chamber 5 towards the tank 3 is prevented, and fluid flow from the pump 2 towards the second chamber 6 is prevented. A flow of fluid is allowed from the second chamber 6 towards the pump 2, via the flow channel 10. This has the consequence that fluid enters the first chamber 5 and fluid leaves the second chamber 6. Accordingly, servomotor piston member 13 will be moved in a direction towards the second chamber 6 as far as possible, i.e. the servomotor 4 is moved to an end position. Due to the flow restrictor 12 this movement takes place gently and at a controlled rate.

In the case that the first valve 7 and the third valve 9 are both in a closed state, thereby preventing fluid flow from the pump 2 to the first chamber 5 or the second chamber 6, a flow of fluid will be allowed from the pump 2 to tank 3 via an additional valve 14.

In the embodiment of FIG. 1 the servomotor piston member 13 is of a kind comprising two pistons with unequal face areas. Due to the unequal face areas the movement of the servomotor piston member 13 described above would be uncontrolled if the flow restrictor 12 was not arranged in the flow channel 10. Arranging the flow restrictor 12 in the flow channel 10 is therefore particularly an advantage in this embodiment.

Figure 2:
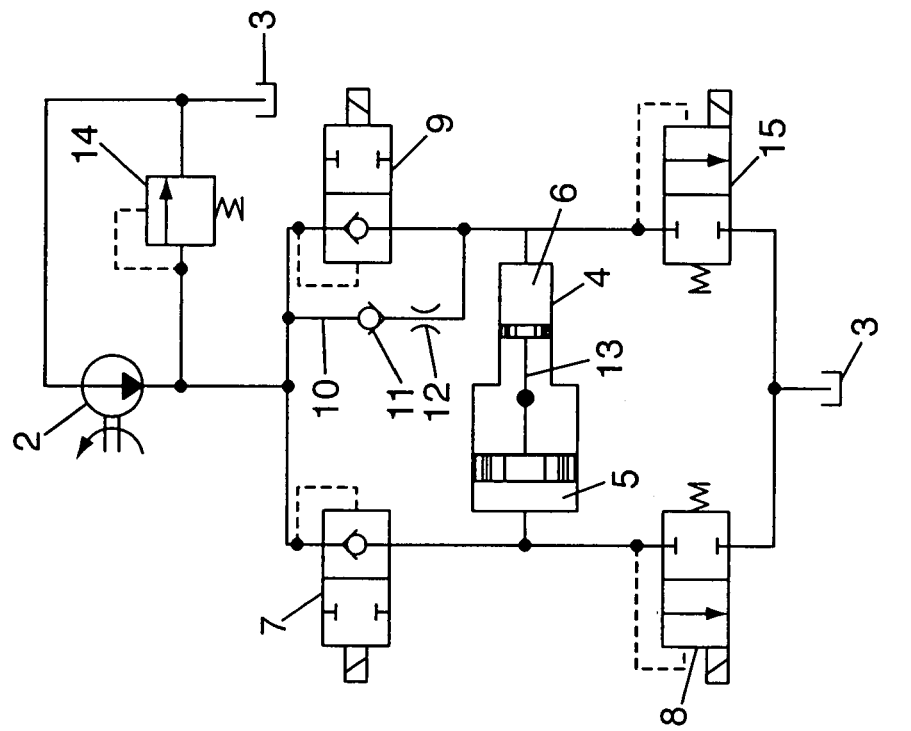
FIGS. 1-7 are schematic diagrams illustrating various embodiments of a hydraulic actuator according to the invention.

FIG. 2 is a schematic diagram of a hydraulic actuator according to a second embodiment of the invention. The embodiment shown in FIG. 2 is very similar to the embodiment shown in FIG. 1, and parts which have already been described above will therefore not be described in detail here.

In the embodiment of FIG. 2 the third valve 9 is a solenoid valve which is closed in an energized state. In a de-energized state the third valve 9 functions as a check valve arranged in such a manner that a flow of fluid is allowed in a direction from the pump 2 towards the second chamber 6, while a flow of fluid in a direction from the second chamber 6 towards the pump 2 is not allowed.

The hydraulic actuator of FIG. 2 further comprises a fourth valve 15 fluidly connected between the second chamber 6 and the tank 3. The fourth valve 15 is a solenoid valve which is closed in a de-energized state and open in an energized state.

In the case of a power cut off the valves 7, 8, 9, 15 will all be in their de-energized states. Accordingly, a fluid flow will be allowed from the pump 2 towards the first chamber 5, via the first valve 7, and from the pump 2 towards the second chamber 6, via the third valve 9. The second valve 8 and the fourth valve 15 prevent fluid flow from the chambers 5, 6 towards the tank 3. However, fluid will be allowed to flow from the second chamber 6 towards the pump 2, via the flow channel 10, as described above. Assuming no movement of the servomotor piston member 13, and that the pressure levels in the first chamber 5 and the second chamber 6 are equal, then due to the unequal face areas of the pistons of the servomotor piston member 13, the equal pressure levels will result in a force on the servomotor piston member 13 towards the second chamber 6. As a consequence, the servomotor piston member 13 is moved in a direction towards the second chamber 6, i.e. the servomotor 4 is moved to an end position as described above. As described above, the flow restrictor 12 ensures that the movement is performed in a gentle and controlled manner.

Figure 3:
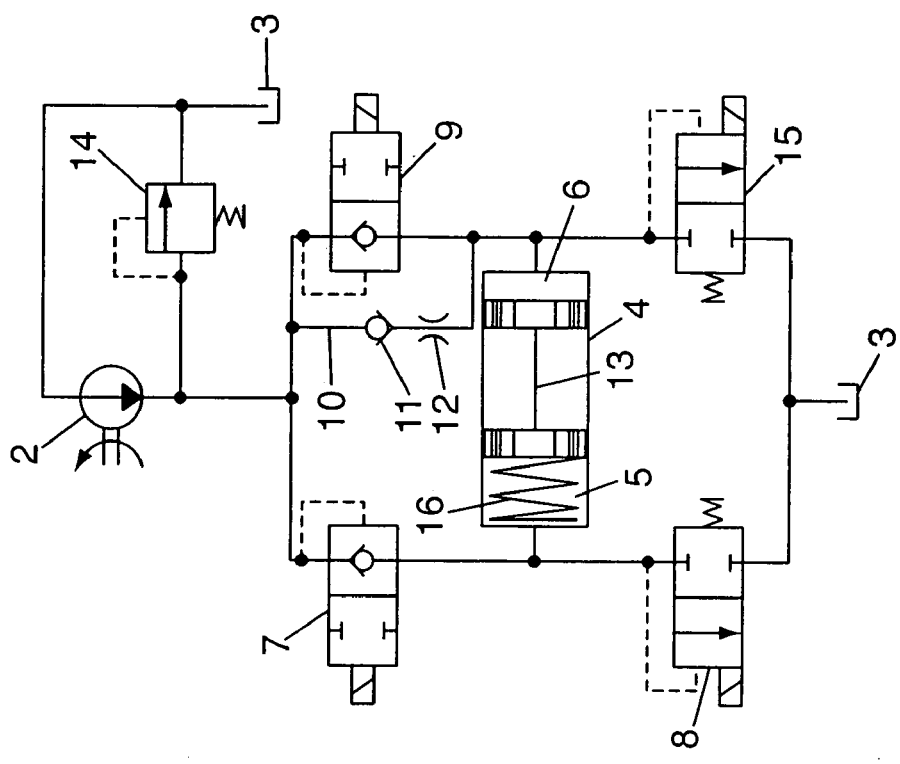

FIG. 3 is a schematic diagram of a hydraulic actuator according to a third embodiment of the invention. The embodiment shown in FIG. 3 is very similar to the embodiment shown in FIG. 2, and parts which have already been described above will therefore not be described in detail here.

In the embodiment of FIG. 3 the servomotor piston member 13 is of a kind having equal face areas. It may be defined by two mechanically linked pistons, or by one single piston. The servomotor piston member 13 is provided with biasing spring 16 arranged in such a manner that it biases the servomotor piston member 13 in a direction towards the second chamber 6. Accordingly, when all of the valves 7, 8, 9, 15 are in their de-energized states, the biasing spring 16 ensures that the servomotor piston member 13 is moved towards the second chamber 6, i.e. that the servomotor 4 is moved to an end position in the case of a power cut off.

Figure 4:
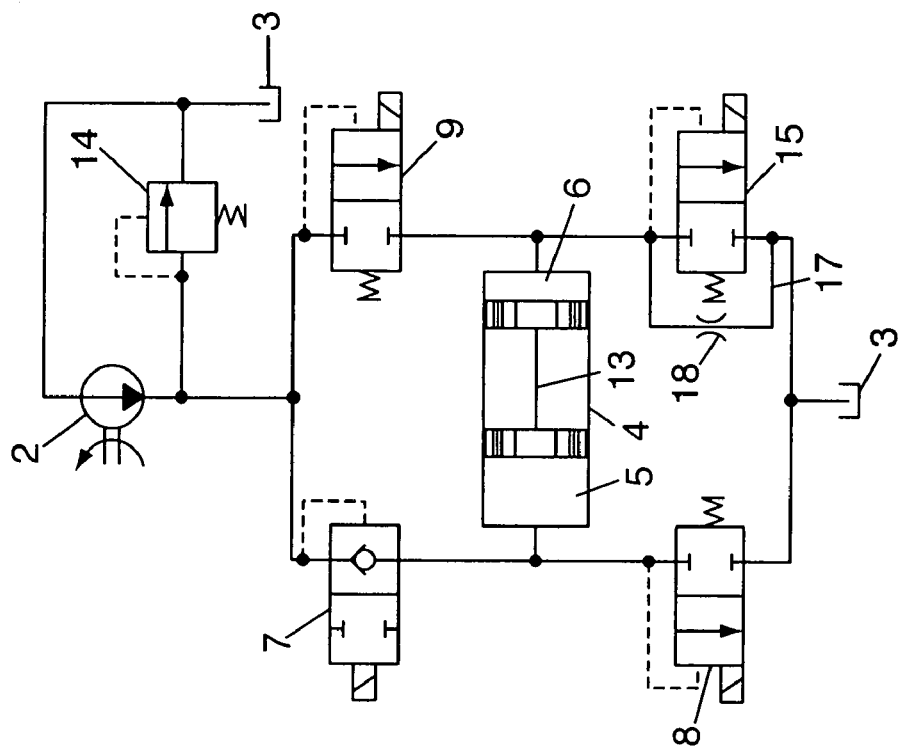

FIG. 4 is a schematic diagram of a hydraulic actuator according to a fourth embodiment of the invention. The embodiment shown in FIG. 4 is very similar to the embodiments shown in FIGS. 1-3, and parts which have already been described above will therefore not be described in detail here.

In the embodiment of FIG. 4 the first valve 7, the second valve 8 and the fourth valve 15 are identical to the corresponding valves 7, 8, 15 described with reference to FIGS. 2 and 3, and the third valve 9 is identical to the corresponding valve 9 described with reference to FIG. 1. The servomotor piston member 13 is of a kind having equal face areas. In this case the servomotor piston member 13 is not biased in a direction towards one or the chambers 5, 6.

In the embodiment shown in FIG. 4 a flow channel 17 is arranged in parallel with the fourth valve 15. A flow restrictor 18 is arranged in the flow channel 17.

In the case of a power cut off, all of the valves 7, 8, 9, 15 will be in their de-energized states. Thus, a flow of fluid will be allowed from the pump 2 towards the first chamber 5, via the first valve 7, but not in the reverse direction. A flow of fluid is prevented from the first chamber 5 towards the tank 3. Thus, fluid will flow into the first chamber 5.

Simultaneously, a flow of fluid is prevented from the pump 2 towards the second chamber 6, and a flow of fluid is prevented from the second chamber 6 towards to tank, via the fourth valve 15. However, a flow of fluid is allowed from the second chamber 6 towards the tank 3, via the flow channel 17, and thereby via the flow restrictor 18.

As a consequence, fluid will enter the first chamber 5, thereby pushing the servomotor piston member 13 in a direction towards the second chamber 6. Thereby the servomotor piston member 13 displaces fluid from the second chamber 6, and this fluid flows via the flow channel 17, and thereby the flow restrictor 18, to the tank 3. Accordingly, the servomotor 4 is moved to an end position, and the movement takes place gently and at a controlled rate due to the flow restrictor 18.

Figure 5:
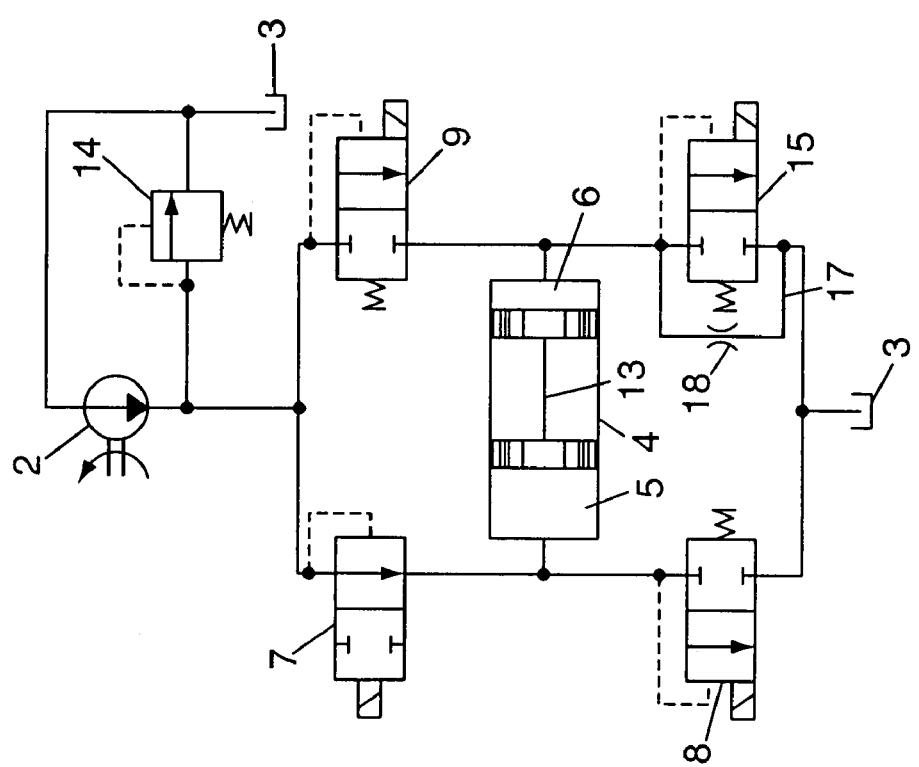

FIG. 5 is a schematic diagram of a hydraulic actuator according to a fifth embodiment of the invention. The embodiment shown in FIG. 5 is very similar to the embodiment shown in FIG. 4, and parts which have already been described above will therefore not be described in detail here.

The only difference between the embodiment shown in FIG. 4 and the embodiment shown in FIG. 5 is that the first valve 7 is a solenoid valve which is open in a de-energized state and closed in an energized state. Accordingly, in the case of a power cut off, a flow of fluid will be allowed between the pump 2 and the first chamber 5 in either direction. Since a flow of fluid is prevented from the pump 2 to the second chamber 6, while a flow of fluid is allowed from the second chamber 6 to the tank, via the flow channel 17 and the flow restrictor 18, the servomotor piston member 13 will gradually be moved in a direction towards the second chamber 6. Thereby the servomotor 4 is moved to an end position.

Figure 6:
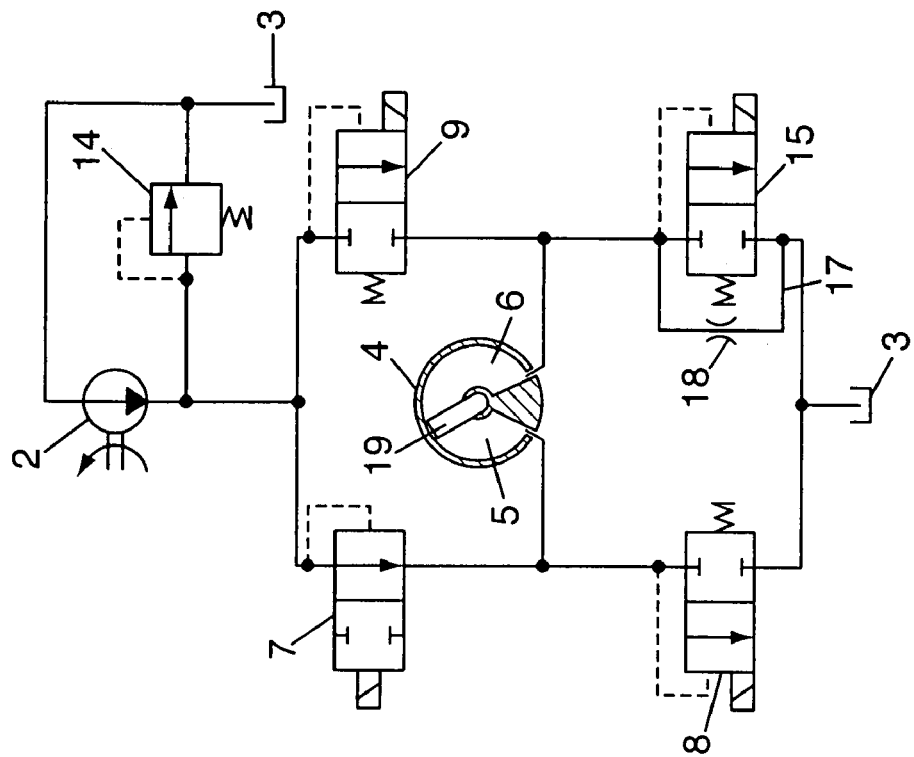

FIG. 6 is a schematic diagram of a hydraulic actuator according to a sixth embodiment of the invention. The hydraulic actuator of FIG. 6 is very similar to the hydraulic actuator of FIG. 5, and parts which have already been described above will therefore not be described in detail here.

The difference between the hydraulic actuator of FIG. 5 and the hydraulic actuator of FIG. 6 is that the servomotor 4 shown in FIG. 6 is of a rotatable kind. The servomotor 4 comprises a first chamber 5 and a second chamber 6, the chambers 5, 6 being fluidly connected to the valves 7, 8, 9, 15 as described above. However, in this case the chambers 5, 6 are divided by a rotating member 19. Thus, opening and closing the valves 7, 8, 9, 15 in an appropriate manner will, in this case, result in a desired fluid flow to/from the chambers 5, 6, and thereby a desired angular position of the rotating member 19 is obtained.

In the case of a power cut off, a flow of fluid will be allowed between the pump 2 and the first chamber 5 in either direction as described above. Furthermore, a flow of fluid is prevented from the pump 2 to the second chamber 6, while a flow of fluid is allowed from the second chamber 6 to the tank 3, via the flow channel 17 and the flow restrictor 18, as described above. Thereby the rotating member 19 will be gradually rotated towards the second chamber 6, i.e. the servomotor 4 is moved to an end position.

Figure 7:
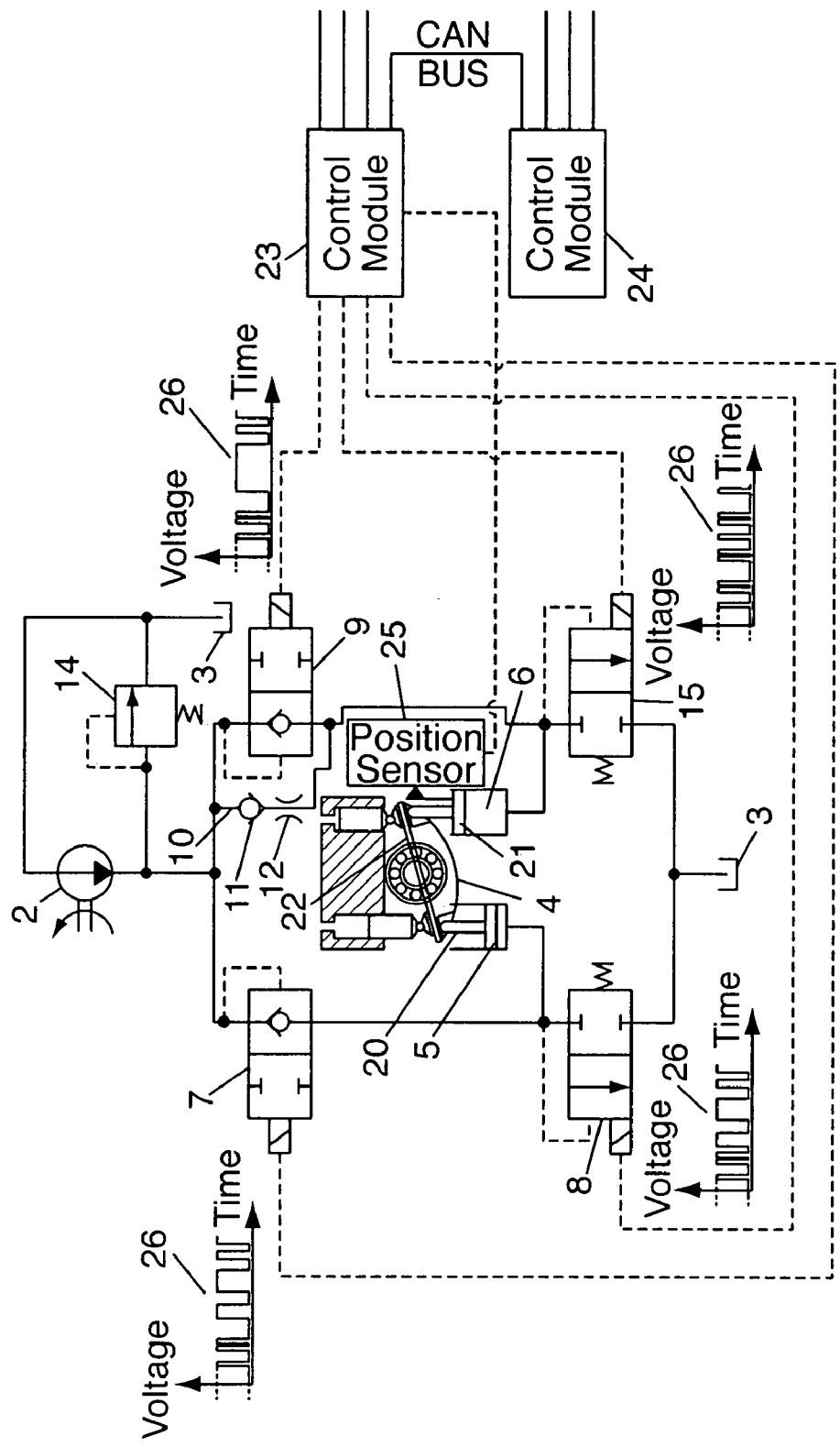

FIG. 7 is a schematic diagram of a hydraulic actuator according to a seventh embodiment of the invention. The hydraulic actuator of FIG. 7 is very similar to the hydraulic actuator of FIG. 2, and parts which have already been described above will therefore not be described in detail here.

The difference between the hydraulic actuator of FIG. 2 and the hydraulic actuator of FIG. 7 is that the servomotor 4 shown in FIG. 7 is of a kind having two linearly moving pistons 20, 21. Each of the linearly moving pistons 20, 21 has a chamber 5, 6, the chambers 5, 6 being fluidly connected to the valves 7, 8, 9, 15 as described above. The linearly moving pistons 20, 21 are attached to a swash plate 22 in such a manner that the angular position of the swash plate 22 is determined by the positions of the linearly moving pistons 20, 21. Thus, in this case, opening and closing the valves 7, 8, 9, 15 in an appropriate manner will result in a desired fluid flow to/from the chambers 5, 6. This will result in desired positions of the linearly moving pistons 20, 21, and thereby in a desired angular position of the swash plate 22.

In the case of a power cut off, the valves 7, 8, 9, 15 will all be in their de-energized states. Accordingly, fluid flows will be allowed from the pump 2 towards the chambers 5, 6, while fluid flows are prevented from the chambers 5, 6 towards the tank 3, as described above. However, fluid will be allowed to flow from the second chamber 6 towards the pump 2, via the flow channel 10. As a consequence, the swash plate 22 will be moved gradually towards an end position.

FIG. 7 further illustrates how a main control module 23 and an extension control module 24 are connected to the servomotor 4. The hydraulic actuator comprises a sensor 25 measuring the position of one of the linearly moving pistons 21, and thereby the position of the swash plate 22. The measured position is supplied to the main control module 23, and based on this, the main control module 23 controls the valves 7, 8, 9, 15 by means of pulse train signals 26 supplied to each of the valves 7, 8, 9, 15. Thus, the valves 7, 8, 9, 15 shown in FIG. 7 are controlled by means of a closed loop control of the servomotor 4.

Figure 8:
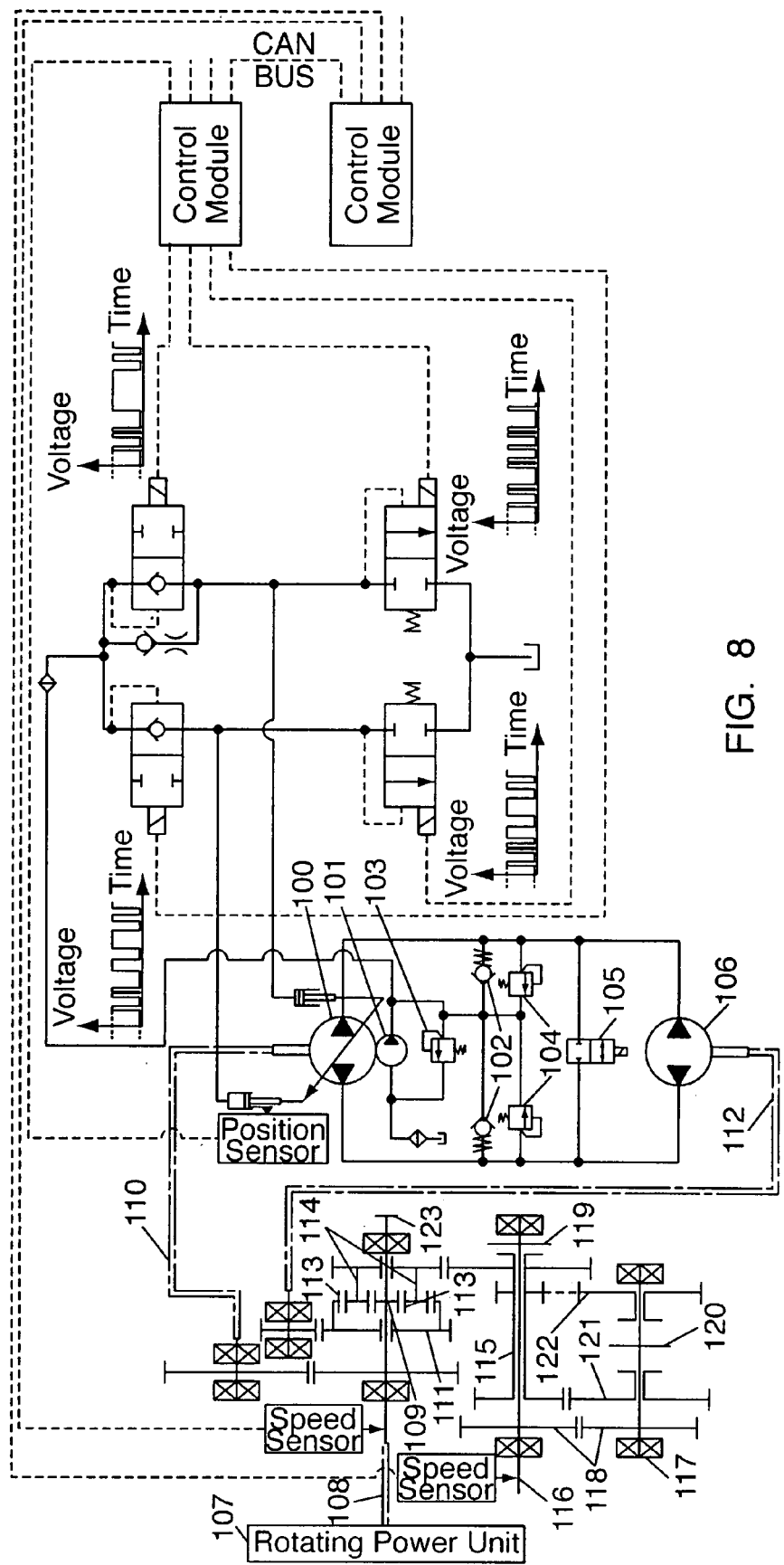
FIG. 8 is a schematic diagram illustrating use of a hydraulic actuator in a hydro-mechanical transmission (HMT).

FIG. 8 is a schematic diagram illustrating use of a hydraulic actuator in a hydro-mechanical transmission (HMT). The valve arrangement of the hydraulic actuator is identical to the one shown in FIG. 2, and it will therefore not be described here.

By metering flow into and out of the two chambers the displacement volume of a variable displacement unit 100 is varied. A charge pump 101 supplies the electro hydraulic actuator with fluid in addition to refilling two branches of the hydraulic main circuit through refill valves 102. A supply pressure relief valve 103 controls the pressure at the outlet of the charge pump 101. Pressure relief valves 104 protect the hydraulic main circuit against overpressure. By bypass valve 105 the two branches of the hydraulic main circuit may be partially or fully connected, thus bypassing a fixed displacement unit 106. For example, this gives the ability to rotate the fixed displacement unit 106 without the variable displacement unit 100 rotating, and visa versa. In the following description it is assumed that the bypass valve 105 is closed.

A rotating power unit 107, for example an internal combustion engine or an electrical motor, is driving an input shaft 108. The angular rotation speed of the input shaft 108 is the same as the angular rotation speed of sun gear 109, since they are connected. A gear drive from input 110 is connecting the input shaft 108 to the variable displacement unit 100. By varying the displacement volume of the variable displacement unit 100 the angular velocity of the fixed displacement unit 106 is varied. The fixed displacement unit 106 is connected to a ring gear 111 of an epicyclic gear train through gear drive to planetary gear 112. Consequently the angular velocity of the fixed displacement unit 106 and the angular velocity of the ring gear 111 are connected at a fixed ratio.

The relative angular velocities of the sun gear 109 and the ring gear 111 decide the angular velocities of the planet gears 113 and thus the angular velocity of the planet carrier 114. The planet carrier 114 drives a gear shaft 115 which is concentric with a first output shaft 116. The first output shaft 116 and a second output shaft 117 are linked through a first gear set 118 and their angular velocities are therefore at a fixed ratio. When all dog rings 119, 120 are disengaged the output shafts 116, 117 can rotate freely compared to the planet carrier 114. When engaging the first dog ring 119 with the gear shaft 115, the gear ratio from the planet carrier 114 to the output shafts 116, 117 is fixed at a first ratio. If engaging the first dog ring 119 with the bearing, the first output shaft 116 will be locked (vehicle park). If instead engaging the second dog ring 120 with a second gear set 121, the gear ratio from the planet carrier 114 to the output shafts 116, 117 is fixed at a second ratio. If instead engaging the second dog ring 120 with a third gear set 122, the gear ratio from the planet carrier 114 to the output shafts 116, 117 is fixed at a third ratio. In each of these gear ratios between the planet carrier 114 and the gear shaft 116, 117 infinitely many gear ratios between the input shaft 108 and the output shafts 116, 117 may be realized by controlling the angular velocity of the ring gear 111 through varying the displacement volume of the variable displacement unit 100. Hereby the gearing range is selected by operating either the first dog ring 119 or the second dog ring 120, while the specific gear ratio within the range is set by operating the variable displacement unit 100 using the electro hydraulic actuator. The specific displacement set-point for the variable displacement unit 100 is generated electronically in the control modules, in response to external sensor signals such as the two speed sensors, or any other sensor(s) connected to the control modules. As an alternative to the gear arrangement shown in FIG. 8, a gear arrangement of the kind disclosed in WO 2006/102906 could be used.

If the displacement volume of the variable displacement unit 100 is zero the ring gear 111 does not rotate, and the power flow is from the rotating power unit 107 to the output shafts 116, 117 through the mechanical gearing only. If the displacement volume of the variable displacement unit 100 is selected so the sun gear 109 and the ring gear 111 rotate in the same angular direction, the power flow going from the rotating power unit 107 to the output shafts 116, 117 is split between the mechanical gearing and the hydraulic main circuit. The fixed displacement unit 106 then works as a motor and the variable displacement unit 100 works as a pump. If the volume displacement of the variable displacement unit 100 is selected so the sun gear 109 and the ring gear 111 rotate in opposite angular directions, power is regenerated back to the input shaft 108 through the hydraulic main circuit. The fixed displacement unit 106 hereby works as a pump and the variable displacement unit 100 works as a motor.

An auxiliary pad 123 may be used as an additional power output, for example for mounting a hydraulic gear pump or mechanically driving a tool such as a snow blower, a snow blade, a plough, a tilt bucket, a herbicide sprayer etc.

While the present invention has been illustrated and described with respect to a particular embodiment thereof, it should be appreciated by those of ordinary skill in the art that various modifications to this invention may be made without departing from the spirit and scope of the present invention.

What is claimed is:

1. A hydraulic actuator for a hydraulic servomotor having a first chamber and a second chamber, the actuator being connected to a fluid source and a fluid drain, the actuator comprising:

a first valve fluidly connected between the fluid source and the first chamber, said first valve being of a kind which is closed in an energized state and allows a fluid flow between the fluid source and the first chamber in a de-energized state at least in a direction from the fluid source towards the first chamber, a second valve fluidly connected between the first chamber and the fluid drain, said second valve being of a kind which, in a de-energized state, prevents a fluid flow between the first chamber and the fluid drain, a third valve fluidly connected between the fluid source and the second chamber, said third valve being of a kind which, in a de-energized state, prevents a fluid flow between the second chamber and the fluid source, at least in a direction from the second chamber towards the fluid source, and a flow channel arranged in fluid communication with the second chamber, said flow channel being arranged in such a manner that a fluid flow is allowed in a direction out of the second chamber via the flow channel.

2. The hydraulic actuator according to claim 1, wherein the hydraulic servomotor is of a kind having at least one defined rest position.

3. The hydraulic actuator according to claim 1, wherein the flow channel comprises or forms a flow restrictor.

4. The hydraulic actuator according to claim 1, further comprising a fourth valve fluidly connected between the second chamber and the fluid drain, said fourth valve being of a kind which, in a de-energized state, prevents a fluid flow between the second chamber and the fluid drain.

5. The hydraulic actuator according to claim 4, wherein the flow channel is fluidly connected between the second chamber and the fluid drain, and in parallel with the fourth valve.

6. The hydraulic actuator according to claim 1, further comprising a check valve fluidly connected between the fluid source and the second chamber, said check valve being arranged in parallel with the third valve in such a manner that a fluid flow is allowed in a direction from the second chamber towards the fluid source, and wherein the flow channel is arranged in series with or integrated with the check valve.

7. The hydraulic actuator according to claim 1, wherein the hydraulic servomotor comprises a moving member, said moving member having a first face area facing the first chamber and a second face area facing the second chamber.

8. The hydraulic actuator according to claim 7, wherein the moving member is provided with biasing means biasing the moving member in a direction towards the first chamber or in a direction towards the second chamber.

9. The hydraulic actuator according to claim 8, wherein the first face area is different from the second face area.

10. The hydraulic actuator according to claim 1, wherein at least one of the valves is an electrically operable valve.

11. The hydraulic actuator according to claim 10, wherein at least one of the valves is driven by a pulse train signal.

12. The hydraulic actuator according to claim 1, wherein the valves are controlled by means of a closed loop control of the hydraulic servomotor.

13. The hydraulic actuator according to claim 12, further comprising at least one sensor, said sensor(s) being adapted to provide an input signal to the closed loop control.

14. Use of a hydraulic actuator according to claim 1 in a hydro-mechanical transmission (HMT).

15. Use of a hydraulic actuator according to claim 1 in an electro hydraulic steering application.

16. A hydraulic actuator for a hydraulic servomotor having a first chamber and a second chamber, the actuator being connected to a fluid source and a fluid drain, the actuator comprising:

a first valve fluidly connected between the fluid source and the first chamber, said first valve being of a kind which, in a de-energized state, allows a fluid flow between the fluid source and the first chamber, at least in a direction from the fluid source towards the first chamber, a second valve fluidly connected between the first chamber and the fluid drain, said second valve being of a kind which, in a de-energized state, prevents a fluid flow between the first chamber and the fluid drain, a third valve fluidly connected between the fluid source and the second chamber, said third valve being of a kind which, in a de-energized state, prevents a fluid flow between the second chamber and the fluid source, at least in a direction from the second chamber towards the fluid source, a flow channel arranged in fluid communication with the second chamber, said flow channel being arranged in such a manner that a fluid flow is allowed in a direction out of the second chamber via the flow channel, and a check valve fluidly connected between the fluid source and the second chamber, said check valve being arranged in parallel with the third valve in such a manner that a fluid flow is allowed in a direction from the second chamber towards the fluid source, and wherein the flow channel is arranged in series with or integrated with the check valve.

\* \* \* \* \*